J. FREDENBURGH.
Carriage-Spring.
No. 167,888.     Patented Sept. 21, 1875.
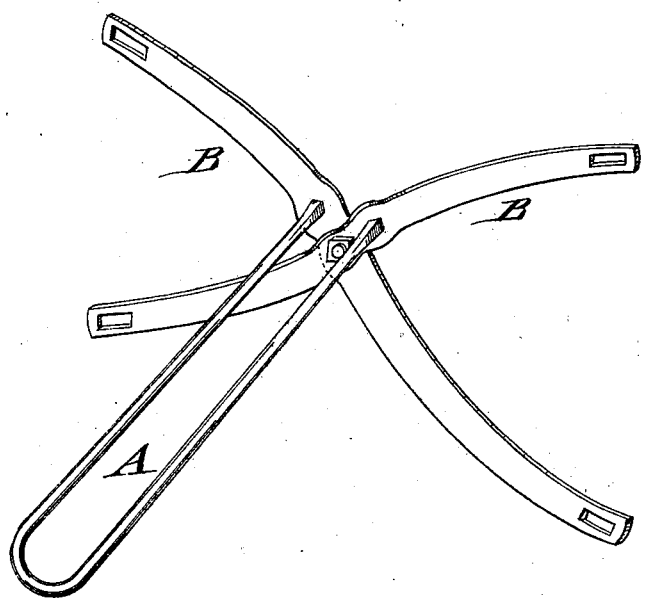
WITNESSES:
INVENTOR: J. Fredenburgh
BY
ATTORNEYS.

UNITED STATES PATENT OFFICE.

JOHN FREDENBURGH, OF GREENE, NEW YORK, ASSIGNOR TO HIMSELF AND J. F. SMITH, OF SAME PLACE.

IMPROVEMENT IN CARRIAGE-SPRINGS.

Specification forming part of Letters Patent No. 167,888, dated September 21, 1875; application filed August 28, 1875.

*To all whom it may concern:*

Be it known that I, JOHN FREDENBURGH, of Greene, in the county of Chenango and State of New York, have invented a new and Improved Torsional Spring, of which the following is a specification:

The accompanying drawing represents a perspective view of my improved torsional spring.

The object of my invention is to provide for vehicles, furniture, and other purposes an improved torsional spring that is of powerful, durable, and reliable construction, and by its compact shape advantageous in many cases.

The invention consists of a straight or curved bar that is rigidly affixed at the ends to fulcrumed lever-arms, and exposed to torsional strain by the swinging and separating of the levers in opposite direction.

In the drawing, A represents a straight or curved steel bar or rod that is securely and firmly attached at the ends by square or other socket to fulcrumed lever-arms B, or to a fixed and movable arm, provided that the lever-arms or socket-points are carried to greater distance and in opposite direction from each other, so as to produce a torsional strain in the spring-bar that increases with the pressure on the levers, and the increase of the distance produced between the end-points of the bar.

The torsional spring may be employed for wagon-springs by coupling two U-shaped springs, that extend in opposite direction to each other in suitable manner, rigidly together, or by passing two straight rods crosswise to separate lever-arms swinging in opposite direction.

The spring may be employed with equal facility, on account of the simple and durable construction, as a furniture-spring, and for other purposes.

Having thus described my invention, I claim as new and desire to secure by Letters Patent—

A torsional spring for vehicles composed of a steel rod socketed at both ends rigidly to lever-arms swinging in opposite direction from each other, to create torsional strain in the steel rod, substantially in the manner and for the purpose set forth.

JOHN FREDENBURGH.

Witnesses:
   L. T. DARBY,
   DE FOREST FREDENBURGH.